United States Patent Office 3,657,443
Patented Apr. 18, 1972

3,657,443
2-BENZIMIDAZOLECARBAMIC ACID, ALKYL ESTERS AS FOLIAR FUNGICIDES
Hein Louis Klopping, Wilmington, Del., assignor to E. I. du Pont de Nemours and Company, Wilmington, Del.
No Drawing. Continuation-in-part of application Ser. No. 727,036, May 6, 1968, which is a continuation-in-part of abandoned application Ser. No. 629,914, Apr. 11, 1967. This application Sept. 29, 1969, Ser. No. 862,081
Int. Cl. A01n 9/22
U.S. Cl. 424—273
3 Claims

ABSTRACT OF THE DISCLOSURE

Compounds of the formula:

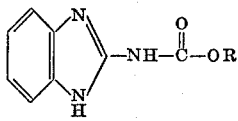

where R is methyl or ethyl, particularly when in the form of particles below 5 microns in diameter, are useful as fungicides to control fungus diseases of living plants. When these compounds are formulated or mixed with suitable adjuvants, such as nonphytotoxic spray oils or humectants, improved fungicidal activity is obtained with continuing safety to the treated plants.

CROSS REFERENCE TO RELATED APPLICATIONS

This application is a continuation-in-part of my copending application Ser. No. 727,036, filed May 6, 1968, now abandoned, which application is a continuation-in-part of my copending application Ser. No. 629,914, filed Apr. 11, 1967, now abandoned.

BRIEF SUMMARY OF THE INVENTION

This invention relates to fungicidal compositions and methods of employing these compositions in the exceptionally beneficial control of fungus diseases of living plants or plant parts. These methods and compositions provide a curative effect while at the same time providing a protective effect with a broad margin of safety to the plants. The matter of safety to plants, obviously, is of the utmost importance.

I have discovered that the aforementioned beneficial effect is provided by compositions comprising or containing and methods employing a compound of the formula:

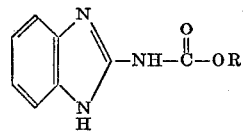

where R is methyl or ethyl, particularly when the compound is in a very finely divided form of particles below 5 microns in diameter and especially when a major amount of the material is in the form of particles below 2 microns in diameter.

It will be understood that the above structure can exist in two tautomeric forms:

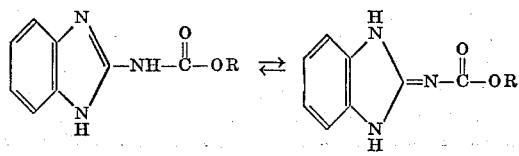

The salient attributes of this invention are that the compositions and methods taught (1) eminently meet the numerous demanding requirements (including lack of phytotoxicity) of practical fungus disease control of desirable plants and (2) provide the highly unique result of curing plants that are already infected with virulent fungi. These attributes are obtained by applying the active ingredient in such a form or with such adjuvants as facilitate its penetration into plants.

In order to be of utility in the control of fungus diseases of living plants, it is necessary that compositions and accompanying methods provide, first and foremost, for an adequate margin of safety to the treated plants. A great many of the compounds which show fungicidal effects when tested in artificial media or on other inanimate substrata cannot be used to control fungus diseases of living plants due to an undesirable effect on the host plants. Further some compounds which are active in vitro are inactive in vivo.

The compositions and methods of this invention are remarkable in the broad range that exists between the minimum use levels required for the desired disease control performance and amounts that can be applied without plant injury (phytotoxicity). In many instances, levels 60 or more times the required minimum use rate are safe on the host plants.

Phytotoxicity may take any of a number of forms among which are: leaf burn, reduced or abnormal top growth, abnormal root growth, reduced fruit set, poor fruit finish, decreased yield and undesirable harvest quality (reduced sugar or protein, disagreeable taste, etc.). The compositions and methods of this invention are free of any implications in adverse effects of these or other types when proper attention is given to the selection of adjuvants.

It has been demonstrated that in many instances heavy metal ions play a part in certain types of phytotoxicity. It has been reported, for example, that trace amounts of copper can damage apple finish. Such heavy metals can also accumulate to undesirable levels in soils. The compositions and methods of this invention make it possible to avoid completely the use of phytotoxic heavy metal ions in treatments for fungus disease control.

Additional requirements for practical fungus disease control on plants include use of available or easily obtainable application equipment, convenience and safety in handling, lack of hazard to the consumer of treated agricultural produce, and others well known to those skilled in the art. The compositions and methods of this invention also satisfy these requisites admirably.

An exceptionally valuable characteristic of the compositions and methods of this invention is their effectiveness in curing fungus infections already present in living plants. Plant diseases are now most commonly controlled by protective sprays applied on a predetermined schedule. Although this requires that the expenditure be made before it is known whether or not disease would actually appear, no other course of action is open to the grower due to the lack of reliable and broadly active curative treatments.

Employing the curative compositions and methods of this invention, no chemical need be applied until after weather conditions or other circumstances have been such as to actually permit the initiation of fungus attack (infection). The teachings of this invention make it possible to eliminate the fungus (or fungi) from within the plant (i.e. to cure the disease). The great savings to the grower in chemical cost and application labor as a result of the curative effect of the compositions and methods of this invention are clearly apparent. When conditions favoring disease fail to appear during the life of a crop, as is sometimes the case, the cost of chemical treatment is entirely eliminated through the knowledge that curative treatments are available if needed.

The active components of this invention can enter and move about within living plants. Such entry and systemic movement is a factor in the curative effect described above. In addition, however, this entry and systemic movement result in effective and extended protection of the treated plants from subsequent new fungus attack. A fungus germinating on the plant surface, penetrating the epidermis and growing into or around the host plant cells comes into contact with the fungicide inside the host and is killed. Thus, treatments made to cure an existing fungus infection also serve the dual purpose of providing protection for the future.

Where this approach is desired for any reason, the compositions and methods of this invention can be employed to provide a conventional preventive control of fungus diseases.

Curative and preventive disease control on desirable living plants are obtained to the greatest extent when the compounds of the formula are finely divided (as described hereinafter) and used as such or in conjunction with various adjuvants, such as certain oils or humectants as defined below.

The matter of particle size deserves special attention. Although the initial effect obtained with a particular chemical is often improved as particle size is reduced, the residual effect frequently decreases. The later phenomenon is associated with characteristics permitting or enhancing excessive chemical loss from small particles. It is part and parcel of this invention that the compounds of the formula are improved in all aspects of performance, especially curative disease control and consistency in activity, as the particle size is decreased to the degree specified. The small particle size material, when used as described, results in the maximum penetration required for most effective curative disease control yet provides full residual disease protection and also an adequate margin of safety to the treated plants.

DETAILED DESCRIPTION OF THE INVENTION

The 2-benzimidazolecarbamic acid esters of the formula can be prepared by any of several methods. For example, the esters can be prepared by a three reaction sequence in which, in the first reaction, thiourea is mixed with dimethyl sulfate to produce 2-methylthiopseudoureasulfate in solution. The second reaction consists of the addition to the reaction mixture of an alkyl chloroformate followed by a base to produce an acylated 2-methylthiopseudourea. The last step consists of the addition of a protonic acid and an o-phenylenediamine to produce the benzimidazoles of the formula.

As previously mentioned, the compounds of the formula provide curative and preventive control of a wide variety of fungus disease of desirable plants without damaging the host.

The many fungi against which the compounds of this invention are active may be represented by, without being limited to, the following: *Venturia inaequalis,* which causes apple scab; *Podosphaera leucotricha,* which causes powdery mildew on apple, *Uromyces phaseoli,* which causes bean rust; *Cercospora apii,* which causes early blight of celery; *Cercospora arachidicola* and *C. personate,* which cause leaf spot of peanuts; *Cercospora beticola,* which causes leaf spot of sugar beets; *Cercospora musae,* which causes Sigatoka disease of banana; *Septoria apii-graveolents* which causes late blight of celery; *Monolinia (Sclerotinia) laxa* or *M. fructicola* which cause brown rot of stone fruits; *Guignardia bidwellii* which causes grape rot; *Botrytis cinerea,* which causes gray mold on fruits and vegetables; *Erysiphe cichoracearum,* which causes powdery mildew on cantaloupe and other cucurbit crops; *Penicillium digitatum,* which causes green mold on citrus; *Penicillium expansum,* which causes blue mold on apples; *Sphaerotheca humuli,* which causes powdery mildew on roses; *Diplocarpon rosae,* which causes black spot on roses; *Pithomyces chartorum* which is found in pastures and other turf areas; *Uncinula necator,* which causes powdery mildew on grapes; *Coccomyces hiemalis,* which causes cherry leaf spot; *Cladosporium carpophilum,* which causes peach scab; *Erysiphe graminis hordei,* which causes powdery mildew on barley; *Piricularia oryzae,* which causes rice blast; *Mycosphaerella citrullina* which causes gummy stem blight of cucurbits; *Colletotrichum spp.,* which cause anthracnose disease on a number of crops and *Sclerotinia sclerotiorum,* which causes mold or rot of beans and other crops.

The compositions and methods of this invention provide curative and protective effects against fungus diseases of living plants when applied to the proper locus by the methods described hereinafter and at a sufficient rate to exert the desired effect. They are especially suited for disease control on living plants such as fruit-bearing trees, nut-bearing trees, ornamental trees, forest trees, vegetable crops, horticultural crops (including ornamentals, grapes, small fruits and berries), fiber crops, grain and seed crops, sugarcane, sugar beets, pineapple, forage and hay crops, beans, peas, soybeans, peanuts, potatoes, sweet potatoes, tobacco, hops, turf and pasture.

Living plants may be cured of fungus diseases or protected from fungus attack by applying one or more of the active compounds to the plant by foliar treatment. Applications to plants to accomplish the initial curative effect as well as to provide subsequent protection from fungus diseases are made to the aerial parts (i.e. stems, foliage or fruit) by spraying, dusting, or misting as described in more detail below.

Preferred rates for application of the compounds of this invention to foilage, stems and fruit of living plants range from 0.02 to 20 kilograms of the finely divided form of the active ingredient per hectare. The optimum amount within this range depends upon a number of variables which are well-known to those skilled in the art of plant protection. These variables include, but are not limited to, the disease to be controlled, weather conditions expected, the type of crop, stage of development of the crop, and the interval between applications. Applications within the range given may need to be repeated one or many more times at intervals of 1 to 60 days.

Application to the foliage, stems and fruit of plants at the rate indicated above is generally accomplished by employing sprays, dusts or aerosols containing the proper amount of active ingredient. For the control of fungus diseases which are regularly present, applications may start prior to the time that the problem actually appears and continue on a pre-determined schedule. Such a procedure is termed "preventive" or "protective" disease control.

With the compositions and methods of this invention, successful control is also accomplished by applications made after the plants are already diseased. Fungus mycelia within the plant tissue are actually killed. This approach or effect is termed "curative" or "eradicant" and permits the user to realize the considerable savings discussed above.

Curative as well as preventive control of plant diseases with the compositions and methods of this invention is enhanced if the treated plant parts are moist for one or more periods of 2 to 12 hours each soon after the composition containing the active compound is applied. Often the slow drying of an original spray treatment or naturally occurring rains, mists, fogs or dews will accomplish this. Under other circumstances, such as during dry periods or in shelters such as greenhouses, it may be necessary to keep the plants moist by some special effort to assure best results. A convenient way in which to accomplish this is through the addition of humectants to the spray or dust preparation.

The compositions of the invention contain in sufficient amount to exert disease control action, one or both of the above-described fungicide compounds in admixture with a carrier material as well as one or more conditioning agents of the kind often used, these materials are commonly referred to in the art as foliar fungicide adjuvants or modifiers. The general classes of foliar fungicide adjuvants applicable to the compounds of this invention are inert solids, organic liquids or aqueous diluents, and small amounts of surface-active agents to obtain wetting, dispersion or emulsification. Compositions adapted for ready and efficient application using conventional applicator equipment are prepared by formulating compounds of this invention with suitable adjuvants by mixing, grinding, stirring or other conventional processes. Normally, the active ingredient comprises 1–98% by weight of fungicidal composition.

Solid compositions may be in the form of dispersible powders or dusts. Dispersible powders are particularly useful and can be prepared by simple mixing and grinding steps and can be used either as such, diluted with inert solids to form dusts, or suspended in a suitable liquid medium for spray application. The powders usually comprise the active ingredient admixed with varying amounts of conditioning agents, including ingredients such as corrosion inhibitors, pigments, stickers, etc. The classes of extenders suitable for the wettable powders of this invention are clays such as the kaolins, diatomaceous earths, and also synthetic silicas and silicates. Diluents of organic origin such as walnut shell flours, lignosulfonates, starches, dextrines, sugars, etc. can also be used.

In compositions such as wettable powders, dusts, suspensions and slurries, except as set forth subsequently, it is necessary to have the active compounds present in the proper amount for optimum fungicidal activity and in a fine particle size. The desired fine particle size can be obtained, for example, by fine grinding. Preferred grinders to obtain such fine particles include ball and pebble mills, sand mills, air mills, pin or stud mills, "Attritors," whizzer mills, ring-roller mills, disk mills and the like. Regardless of the type of grinder used, the grinding process must be carried out under conditions to assure that the product which is made shall have an adequately fine particle size. Particle size classifiers can be used in conjunction with the grinders to help meet this requirement. The use of sucrose as a grinding aid also helps obtain the desired particle size.

These very finely divided forms of the active ingredient are surprisingly more active than formulations of conventional particle size. The finely divided form has improved penetration into the plants and, thus, enhances the curative effect. These fine particles also have improved solubility characteristics. Further, these forms are stable and have good residual activity, thus providing preventive control. With many fungicides, a reduction in particle size can lead to problems of both instability and phytoxicity; this is not the case with the finely divided forms of this invention.

By very finely divided form it is meant that the particle size is predominantly less than 5 microns in diameter with at least 40% by weight of the active compound and preferably 60% by weight, in the form of particles below 2 microns in diameter. The particle size refers to the ultimate particle size as it exists in the spray droplet or dust which contacts the plant. In the dry compositions, or even in the spray slurry before spraying, the fine particles can exist as floccules or aggregates, or agglomerates, in which several fine particles are associated together.

The preferred method to determine the particle size of the compounds of this invention is by sedimentation analysis in an Andreasen pipette. In this method, the decrease of concentration is determined of particles at a particular level in a suspension, as they settle according to Stokes' law under the influence of gravity. This is a wellknown technique for particle size analysis, and numerous references can be cited to describe in general low particle size and particle size distributions can be determined by this method:

Orr and Dallavelle "Fine Particle Measurement" MacMillan Co., New York 1959, Chapter 3.

Irani and Callis, "Particle Size Measurement, Interpretation, and Application" John Wiley & Sons, New York, 1963, Chapter 5.

Herdan "Small Particle Statistics," 2nd Edition, Academic Press, New York, 1960, Chapter 20.

Lauer "Grain Size Measurements on Commercial Powders," Alpine AG, Augsburg, Germany, English Edition, 1966.

For the compounds of this invention, a sample of formulated commodity, or if the technical material is used, a sample of the technical active ingredient plus suitable wetting and dispersing agents, is dispersed to form a slurry of up to 1% concentration in sufficient volume to fill the Andreasen pipette. This is preferably done by gently pasting the material in about 10% of the final volume using distilled water and then stirring for about 15 minutes to disperse the product. The concentrate is then diluted with additional distilled water to the appropriate volume for the pipette. Before the start of the actual sedimentation analysis the pipette is shaken vigorously for about 1 minute and then inverted vigorously 10 to 20 times to obtain a homogeneous slurry.

Immediately before the start of the settling period a sample is taken to represent the initial, uniform slurry. Sedimentation is then carried out by allowing the pipette to stand undisturbed, free from vibrations, at constant temperature, so that the particles can settle in accordance with the terminal velocity governed by their size and the balance between gravity forces and drag forces in the sedimentation fluid. Samples are withdrawn from the Andreasen pipette at suitable time intervals corresponding to the particle sizes of interest. The amount of active ingredient in each sample represents material which has not yet settled below the sampling point, and which therefore has a particle size smaller than those particles which would have settled below the sampling point in the indicated time period.

From the analysis of the active ingredient content of the samples and the settling times, the sedimentation diameters, or a particle size distribution curve can be calculated by the use of Stokes' Law. In the calculation of Stokes diameters, some assumptions must be made regarding the particle shape, and the particle sizes referred to for the compounds of this invention are the equivalent spheres, e.g., the particle diameter is defined as the diameter of a spherical particle that would settle at the same rate as the particle concerned. These sizes are found by using the equation $$d = 175 \sqrt{\frac{n}{\rho_1 - \rho_2} \cdot \frac{h}{t}}$$

where
$d$ = diameter of particle in microns
$n$ = viscosity in g./cm./sec.
$\rho_1$ = specific gravity of solid in g./cm.$^3$
$\rho_2$ = specific gravity of liquid in g./cm.$^3$
$h$ = settling distance in cm.
$t$ = settling time in minutes.

One critical aspect of pipette sedimentation analysis is the requirement that the particles of the compounds of this invention are dispersed in the sedimentation fluid and not agglomerated or flocculated so that the particles can settle as individuals rather than as aggregates. If the degree of dispersion is poor, e.g., if particles settle as aggregates, inaccurate results are obtained, and the particle size distribution appears to be coarser than it really is. There are a number of methods to ascertain that a good dispersion, suitable for sedimentation analysis, is obtained. One such method is microscopic examination of drops of the dilute suspension in transmitted light at a suitable magnification. A poorly dispersed sample will show characteristic flocculation structures, whereas a well-dispersed one will show individual particles evenly spaced, with particles smaller than approximately 2 microns exhibiting Brownian movement. Since the agitation inherent in placing drops on a microscope slide and applying a cover glass may redisperse agglomerated material, examination of such slides should be made not only immediately upon preparation, but also a few minutes later to determine whether flocculation exists. Another method of checking for adequate dispersion is to take samples representing a given cut size at different sample heights in the pipette, e.g., after different settling times. This can be accomplished, for example, by using different volumes of settling fluid in the Andreasen pipette. Since flocculation is a phenomenon which often takes place slowly with time, a significant discrepancy between the results for a given cut size obtained in this manner would indicate inadequate dispersion, particularly if the percentage of active ingredient remaining in the sample is less in the sample which has been allowed to settle through the greater distance for the longer time period.

If the formulations of the 2-benzimidazolecarbamic acid esters contain clays and other water-insoluble ingredients, the samples taken during Andreasen sedimentation analysis are analyzed optically for the amount of active ingredient. A 1 ml. aliquot of the sample is shaken with about 70–80 mls. of 0.1 N NaOH, and diluted to 100 ml. A 10 ml. portion of this suspension is clarified by suitable filtration (such as in a Swinny filter attached to a syringe) and the UV absorbance of the clarified solution or an aliquot of the same is determined on a spectrophotometer at 292 m$\mu$. The amount of 2-benzimidazolecarbamic acid ester is then obtained by comparison to a calibration curve obtained in a similar manner from known amounts of active ingredient. Where the other, water-soluble ingredients, such as the surface-active agents, also have UV absorbance at the 292 m$\mu$ wavelength, suitable corrections must be made.

When the material which is evaluated by pipette sedimentation consists of technical compound of the invention, possibly in the presence of wetting and dispersing agents to get adequate dispersion in the sedimentation fluid, or where the formulation ingredients other than the compound of the invention are soluble in the sedimentation fluid, the amount of active ingredient in the different pipette samples taken after different time periods can be determined by simple gravimetric analysis of the total solids present, making due allowances for the constant amount of dissolved solids in all samples.

Another method sometimes useful for particle size analysis for compounds of this invention is microscopic counting. This method, however, is applicable only in cases where the active ingredients are the only solids visible in the microscope. In most formulations the inerts and the other additives will also show up as particles in the microscope, and it is usually difficult to differentiate between particles of fungicidal compound versus the additives. Where, however, a particle size of the pure active compound is to be determined, or where the formulation additives can be dissolved away or are soluble in the medium which is placed on the microscope slide with the active ingredient, or where the formulation is a suspension concentrate in which the active compound is the sole or predominant solid phase, microscope methods can often be used. There are numerous general references to microscopic analysis such as:

Orr and Dallavalle "Fine Particle Measurement" MacMillian Co., New York 1959, Chapter 2.

Irani and Callis "Particle Size: Measurement, Interpretation, and Application" John Wiley & Sons, New York, 1963, Chapter 6.

Herdan "Small Particle Statistics," 2nd Edition, Academic Press, New York, 1960, Chapter 18.

Lauer "Grain Size Measurements on Commercial Powders," Alpine AG, Augsburg, Germany, English edition, 1966, Chapter 4.

A method to determine the particle size of the compounds of this invention is to take photomicrographs, for example at 800× magnification, and then compare the individual particles on the pictures against a thin transparent template which has round holes corresponding to 1, 2, 3, etc. microns at that magnification. Particle images matching in area a given hole size can be counted, and duplicate counts can be avoided by piercing the photomicrograph with a needle whenever a particle has been counted. By counting at least approximately 700–1000 particles in this manner, a particle size distribution can be calculated.

When particle size distributions are calculated from microscopic counts, an assumption must be made concerning the third dimension (height or thickness) which of course does not appear in the microscope. Comparisons of Andreasen pipette sedimentation results as described above with microscopic counts have shown that good results are obtained from microscopic particle size analysis when it is assumed that all of the particles have the same thickness, e.g., that the larger particles are platelets. With this assumption, the weight fractions are calculated from the square of the particle diameters measured by inspection with the plastic template. However, where it is known that the large particles are approximately cubical or spherical it will be more accurate to calculate the particle size distribution from the cubes of the particle diameters.

In microscopic particle size analysis great care must be taken that the sample which is to be examined on the microscope slide is representative of the product whose particle size is to be determined, and that the photomicrographs from which the actual counts are made are representative of the slides being evaluated. As will be appreciated by those skilled in the art it is usually necessary to prepare several microscope slides, in each case taking separate samples from the product or the slurry of the product, and then for each slide to inspect a number of fields in order to obtain a representative view to count.

The active ingredient usually makes up from about 15–90% of wettable powder compositions. Wettable powders can also be converted to dusts containing 1–25% of active material by mixing or grinding with pyrophyllite, talc, volcanic ash, ground phosphate rock, organic dusts, and other dense, rapid-settling inert solids. Alternatively, dusts can be prepared by grinding the dust diluents with the active ingredient, or by preparing dust concentrates for further dilution. These dust concentrates can contain from 25–98% of the active ingredient, blended and ground with diluents and, if desired, small amounts of surface-active agents.

Liquid compositions employing one or more of the active disease control compounds of this invention are prepared by admixing the active ingredient with a suitable liquid diluent medium. The active ingredient can be either in solution or in suspension or both in the liquid medium. Typical of the liquid media which may be used are water, paraffinic spray oils, alkylated naphthalenes, xylene, alcohols, chlorinated hydrocarbons and ketones. The active ingredient usually makes up from about 0.5 to 50% of these liquid compositions. In addition, emulsifiers may be present to aid in the suspension or dispersion or to emulsify the composition into water, and stickers can be present to improve adhesion to foliage.

Compositions of the invention, especially liquids and wettable powders, contain wetting agents, dispersing agents, suspending agents and emulsifying agents in amounts sufficient to render a given composition readily dispersible in water or in oil. Suitable such surface-active agents include anionic, cationic, non-ionic and amphoteric types although many cationic species are phytotoxic and therefore not preferred. In general, less than 10% by weight of the surface-active agent is present in the compositions of this invention, although frequently the amount of surface-active agent in these compositions is less than 2% by weight. However, as described in detail in applicant's copending application Ser. No. 861,791, filed Sept. 29, 1969, entitled "Fungicidal Formulation of 2-Benzimidazolecarbamic Acid, Alkyl Esters," higher levels of surfactants relative to the active component give unusual and unexpected beneficial results.

Among the non-ionic and anionic surfactants, those most suitable for the preparation of the dry, wettable products of this invention, are solid forms of compounds known to the art as wetters and dispersants. Occasionally a liquid, non-ionic compound classified primarily as an emulsifier may serve as both wetter and dispersant.

Suitable wetting agents are alkylbenzene- and alkyl-naphthalenesulfonates, sulfated fatty alcohols, sulfated or sulfonated long-chain amines or acid amides, long-chain esters of sodium isethionate, esters of sodium sulfosuccinate, sulfated or sulfonated fatty acid esters, petroleum sulfonates, sulfonated vegetable oils and ditertiary acetylenic glycols. Preferred dispersants are methylcellulose, polyvinyl alcohol, sodium, calcium, and magnesium lignin sulfonates, polymeric alkylnaphthalene-sulfonates, sodium naphthalenesulfonate polyvinylpyrrolidone derivatives, polymethylene bisnaphthalenesulfonates, and sodium N-methyl-N-(long-chain acid)taurates.

Wetting and dispersing agents in the preferred wettable powder compositions of this invention are usually present at concentrations of from about 0.5 weight percent to 5 weight percent. The inert extender then completes the formulation. Where needed, 0.1 weight percent to 1 weight percent of the extender may be replaced by a corrosion inhibitor or an antifoaming agent, or both.

Emulsifying agents most suitable for the liquid compositions of this invention are alkylaryl polyethoxy alcohols; condensation products of ethylene oxide with long-chain alkyl alcohols, mercaptans, or amines; sorbitan fatty acid esters, polyoxyethylene sorbitan or sorbitol fatty acid esters; polyethylene glycol fatty esters, fatty alkylol amide condensates; amine salts of fatty alcohol sulfates, and oil soluble salts of petroleum sulfonates. Mixtures of emulsifying agents are often preferred. Such emulsifying agents will comprise from about 1 to 10 weight percent of the total composition.

Fungus disease control on living plants, particularly curative, with the compounds of the formula is markedly improved by using certain adjuvants, for example in the water in which the benzimidazole fungicide is applied. These adjuvants can be an integral part of the formulation or can be added separately from the active compounds. These adjuvants can be certain oils or humectants. They markedly improve the disease control performance of the compounds of this invention on foliage, stems and fruit. This adjuvant effect is most marked, but not so limited, in situations in which the fungi have already entered the plant and, therefore, a curative effect is required.

With the use of these oils and humectants the particle size of the active ingredient is not as critical, although the best results still are obtained when the finely divided active ingredient is used.

The oils which act to improve activity include aliphatic and aromatic hydrocarbon spray oils and triglycerides, either with or without surface-active agents to permit dispersion in water. Preferred oils include non-phytotoxic aliphatic spray oils such as "Orchex" 796, and those made emulsifiable with polyoxyethylene sorbitol oleates ("Atlas" G–1086 and "Atlox" 1087) or polyhydric alcohol esters ("Trem" 014) or polyoxyethylene oleyl ether; castor oil and corn oil made emulsifiable with octylphenoxy-polyethoxyethanol ("Triton" X–114) and polyoxyethylene sorbitol oleates ("Atlas" G–1086 and "Atlox" 1087); Volck Oil #70, α and β pinenes and low molecular weight polymers therefrom, Sunoco Superior Spray Oil No. 7E and similar nonphytotoxic spray oils of vegetable, animal or mineral origin.

Humectants improve the fungicidal activity of the compounds of this invention, either with or without surfactants, because they reduce the rate and degree of drying of the treated plant surfaces and thus favor penetration of the fungicide into the plant tissues. Compounds which function as humectants include glycerol, glycols such as ethylene, propylene, butylene, diethylene, triethylene, polyethylene and polypropylene; and condensation products of ethylene oxide with active hydrogen compounds where the product contains at least three ethoxy units and consists of 10% or more ethoxy units by weight. Examples of such active hydrogen containing compounds are alcohols, amines, amides, mercaptans, phenols, carboxylic acids, sorbitol, or any combination of these. Also, suitable as humectants are the metallic (especially the alkali and alkaline earth), amine, ammonium and quaternary ammonium salts of organic sulfonic acids; phosphorus, phosphoric and polyphosphoric acids and polyphosphates; as well as the mono esters of sulfuric acid. Such compounds include sodium methanesulfonate, potassium ethanesulfonate, sodium toluenesulfonate, sodium dodecylbenzenesulfonate, salts of disulfonated alkyl diphenyl ether, the triethanolamine salt of decyl sulfuric acid and tetramethylammonium octyl sulfate. Also effective are inorganic salts which are deliquescent in nature such as calcium chloride, sodium and magnesium sulfates as well as starch hydrolyzates, mannitol, sorbitol and derivatives. Other humectants include water-soluble or dispersible synthetic or naturally occurring polymers or gums, such as polyvinyl alcohol, gelatin, guar gum and agar.

Preferred humectants are organic sulfonates, acid sulfates, polyphosphates and condensation products of ethylene oxide. Thus, some preferred humectants also may have some surface activity; however, the humectant effect is due solely to the presence of the hydrophyllic group or groups such as sulfonate, phosphate, sulfate and polyethoxy, while the surfactant activity depends upon a proper balance between hydrophyllic and hydrophobic groups within the molecule. In some preferred humectants, therefore, the penetrant effect is the result of a combination of humectancy and surfactancy.

Furthermore, in many instances, it will be beneficial to combine the oils and humectants with surfactants.

The preferred rates for these oils and humectants when used in sprays is in the range from 10 to 50,000 parts per million of the spray fluid. More preferred rates are in the range of 20 to 15,000 parts per million and the most preferred rates are in the range of 100 to 5,000 parts per million.

For dusts, the preferred rates of active ingredient are in the range of 1,000 to 200,000 parts per million of the material actually applied. More preferred rates are in the range of 2,000 to 100,000 parts per million with the most preferred rates being in the range of 4,000 to 50,000 parts per million.

The compositions containing the active ingredient and the oils and humectants useful to enhance the disease control activity can be made in several ways. For example, the oil or humectant can be mixed with the active ingredient or the active ingredient formulated in a conventional composition, as previously described, when spray slurries are being prepared. It is often also possible and convenient to produce formulations in which the additive and the active ingredient will both be present in a composition which is convenient to apply, for example, by dispersion in water followed by spraying. Such compositions can be powders, suspensions, or even solutions, depending upon the physical and chemical characteristics of the components that are to be prepared. In suspension formulations the penetrant may replace a portion or even all of the liquid carrier.

It is often convenient and beneficial to provide the oils or humectants as a separate composition, for example as a water soluble or dispersible liquid or solid, or as a mixture with diluents such as clay or fine silica. This procedure provides for convenient addition to a spray slurry and enhances the biological activity of the application.

It will be readily understood by those skilled in the trade and in the light of the above teachings that the ratios of active ingredient compound to oil or humectant can vary widely. Thus, the oil or humectant can be present in such mixtures within the range of from 3 to 20,000 parts per 100 parts of active ingredient. More preferred are rates of from 10 to 10,000 parts per 100 parts of active ingredient and a range of ratios from 20 to 2,000 per 100 parts of active ingredient is even more preferred. The lower ratios are useful when higher concentrations of the active compound are applied while the higher ratios are most useful when lower concentrations of the active compound are applied.

Further, the active compound of the formula can be applied in the form of an acid salt composition as described in assignee's copending application Ser. No. 629,911, filed Apr. 11, 1967. The acid salt compositions can have their activity improved by the addition of the above-described oils and humectants.

Compositions of the compounds of the formula can contain, in addition, conventional insecticides, miticides, bactericides, nematocides, additional fungicides or other agricultural chemicals such as fruit set agents, fruit thinning compounds, fertilizer ingredients and the like, so that the compositions can serve additional useful purposes.

The following are illustrative of the agricultural chemicals that may be included in compositions of the compounds of this invention or, additionally, that may be added to sprays containing one or more of the active compounds of this invention.

The additional agricultural chemicals are employed in mixtures or combinations in amounts varying from one-fifth to twenty times that of the compounds or compounds of this invention. The proper choice of amounts is readily made by one skilled in the art of protecting plants from pest depredation.

1,2,3,4,10,10-hexachloro-1,4,4a,5,8,8a-hexahydro-1,4-endo-exo-5,8-dimethanonaphthalene (aldrin);
1,2,3,4,5,6-hexachlorocyclohexane (lindane);
2,3,4,5,6,7,8,8-octachloro-4,7-methano-3a,4,7,7a-tetrahydroindane;
1,1,1-trichloro-2,2-bis(p-chlorophenyl)ethane (DDT);
1,2,3,4,10,10-hexachloro-6,7-epoxy-1,4,4a,5,6,7,8,8a-octahydro-1,4-endo-exo-5,8-dimethanonaphthalene (dieldrin);
1,2,3,4,10,10-hexachloro-6,7-epoxy-1,4,4a,5,6,7,8,8a-octahydro-1,4-endo-endo-5,6-dimethanonaphthalene (endrin);
1(or 3a),4,5,6,7,8,8-heptachloro-3a,4,7,7a-tetrahydro-4,7-methanoindene;
1,1,1-trichloro-2,2-bis(p-methoxyphenyl)ethane (methoxychlor);
1,1-dichloro-2,2-bis(p-chlorophenyl)ethane; chlorinated camphene having a chlorine content of 67–69%;
2-nitro-1,1-bis(p-chlorophenyl)butane;
1-naphthyl-N-methylcarbamate ("Sevin"® carbaryl);
methylcarbamic acid, ester with phenol, 4-(dimethylamino)-3,5-dimethyl;
methylcarbamic acid, ester with 1,3-dithiolan-2-one oxime;
O,O-diethyl O-[2-isopropyl-4-methylpyrimid-6-yl]-thiophosphate;
O,O-dimethyl 1-hydroxy-2,2,2-trichloroethyl phosphonate (diazinon);
O,O-dimethyl S-(1,2-dicarbethoxyethyl)dithiophosphate (malathion);
O,O-dimethyl O-p-nitrophenyl thiophosphate (methyl parathion);
O,O-diethyl O-p-nitrophenyl thiophosphate (parathion);
O,O-dimethyl O-(3-chloro-4-nitrophenyl) thiophosphate;
dl-2-cyclopentenyl-4-hydroxy-3-methyl-2-cyclopenten-1-one chrysanthemumate;
O,O-dimethyl O-(2,2-dichlorovinyl) phosphate (DDVP dichlorvos); mixture containing 53.3% "Bulan," 26.7% "Prolan" and 20.0% related compounds;
O,O-dimethyl O-(2,4,5-trichlorophenyl) phosphorothioate;
O,O-dimethyl S-(4-oxo-1,2,3-benzotriazine-3(4H)-yl-methyl) phosphorodithioate ("Guthion"® azinphosmethyl);
bis-(dimethylamino)phosphonous anhydride;
O,O-diethyl-O-(2-keto-4-methyl-7-a'-pyranyl) thiophosphate;
O,O-diethyl (S-ethylmercaptomethyl) dithiophosphate;
calcium arsenate;
sodium aluminofluoride;
dibasic lead arsenate;
2'-chloroethyl 1-methyl-2-(p-tert-butylphenoxy)ethyl sulfite; azobenzene;
ethyl 2-hydroxy-2,2-bis(4-chlorophenyl)acetate;
O,O-diethyl O[2-(ethylmercapto)ethyl] thiophosphate (Systox® demeton);
2,4-dinitro-6-sec-butylphenol;
toxaphene;
O-ethyl O-p-nitrophenyl benzenethiophosphonate (EPN®);
4-chlorophenyl 4-chlorobenzenesulfonate;
p-chlorophenyl phenyl sulfone;
tetraethyl pyrophosphate (TEPP);
1,1-bis-(p-chlorophenyl)ethanol;
1,1-bis-(p-chlorophenyl)-2,2,2-trichloroethanol (Kelthane® dicofol);
p-chlorophneyl p-chlorobenzyl sulfide;
bis-(p-chlorophenoxy)methane;
3-(1-methyl-2-pyrrolidyl)pyridine;
mixed ester of pyrethrolone and cinerolone keto-alcohols and two chrysanthemum acids;
cube and derris, both whole root and powdered;
ryanodine;
mixture of alkaloids known as veratrine;
2-(o-hydroxyphenyl)-1,3-dithiolane methylcarbamate ester;
2-(o-hydroxyphenyl)-1,3-dioxolane methylcarbamate ester;
dl-2-allyl-4-hydroxy-3-methyl-2-cyclopenten-1-one esterified with a mixture of cis and trans dl-chrysanthemum monocarboxylic acids;
butoxypolypropylene glycol;
ethyl 2-hydroxy-2,2-bis(4-chlorophenyl)acetate (chlorobenzilate);
p-dichlorobenzene;
2-butoxy-2'-thiocyanodiethyl ether;
naphthalene;
methyl O-carbamylthiolacetohydroxamate;
1,1-dichloro-2,2-bis(p-ethylphenyl)ethane;
methyl O-(methylcarbamyl)thiolacetohydroxamate (methomyl);
p-dimethylaminobenzenediazo sodium sulfonate;
2-heptadecylimidazoline acetate (glyodin);
quinone oxyaminobenzooxohydrazone;
tetralkylthiuram disulfides such as tetramethylthiuram disulfide or tetraethyl thiuram disulfide;
sulfur;
metal salts of ethylenebisdithiocarbamic acid or propylenebisdithiocarbamic acids, e.g.
manganese, zinc, iron and sodium salts (maneb or zineb);
pentachloronitrobenzene;
2-(1-methylheptyl)-4,6-dinitrophenyl crotonate and other nitrophenol derivatives;
n-dodecylguanidine acetate (dodine);
N-(trichloromethylthio)phthalimide;
N-trichloromethylthiotetrahydrophthalimide (captan);

cis-N-[(1,1,2,2-tetrachloroethyl)thio]-4-cyclohexane-1,2-dicarboximide;
2,4-dichloro-6-(o-chloroaniline)-s-triazine ("Dyrene"®);
bis(4-chlorophenyl)-3-pyridylmethanol;
N-methylmercury p-toluenesulfonanilide;
chlorophenolmercury hydroxides;
nitrophenolmercury hydroxides;
ethylmercury acetate;
ethylmercury 2,3-dihydroxypropylmercaptide;
methylmercury acetate;
methylmercury 2,3-dihydroxypropylmercaptide;
3,3'-ethylenebis(tetrahydro-4,6-dimethyl-2H-1,3,5-thiadiazine-2-thione);
methylmercury dicyandiamide;
N-ethyl-mercury-p-toluenesulfonanilide;
Triphenyltin hydroxide;
1,4-dichloro-2,5-dimethoxybenzene;
Triphenyltin acetate;
metal (e.g. iron, sodium and zinc), ammonium and amine salts of dialkyldithiocarbamic acids;
2,6-dichloro-4-nitroanaline;
tetrachloronitroanisole;
hexachlorobenzene;
hexachlorophene;
methylmercury nitrile;
tetrachloroquinone;
2,3-dichloro-1,4-naphthoquinone;
N-trichloromethylthiophthalimide;
cupric hydroxide;
tribasic copper sulfate;
fixed copper;
1,2-dibromo-2-chloropropene;
1,2-dibromo-3-chloropropane;
dichloropropane-dichloropropene mixture;
ethylene dibromide;
chloropicrin; and
sodium dimethyldithiocarbamate;
tetrachloroisophthalonitrile;
1-benzimidazolecarboxylic acid, 2-carboxyamino, dimethyl ester;
2,3-dihydro-5-carboxanilide-6-methyl-1,4-oxathiin-4,4-dioxide;
streptomycin or other antibiotics;
2-(2,4,5-trichlorophenoxy)propionic acid;
p-chlorophenoxyacetic acid;
1-naphthaleneacetamide; and
N-(1-naphthyl)acetamide.

The agricultural chemicals listed above are merely exemplary of the compounds which can be mixed with the active compounds of this invention and are not intended to any way limit the invention.

The use of pesticides such as those listed above in combination with a compound within the scope of this invention sometimes appears to greatly enhance the activity of the active compound of the invention. In other words, an unexpected degree of activity is sometimes seen when another pesticides is used along with the methods of this invention.

The combination of sulfur or maneb with the compounds of the invention is particularly useful in view of the unexpected degree of activity obtained. These mixtures will generally be made in the ratio of 2-benzimidazolecarbamic acid, alkyl ester to sulfur of 4:1 to 1:4 and to maneb of 2:1 to 1:10.

In order that the invention may be better understood, the following examples are offered:

Example 1

The compound 2-benzimidazolecarbamic acid, methyl ester is prepared by the following method.

A mixture of 228 parts of thiourea and 110 parts of water is treated over a five minute period with 244 parts of dimethyl sulfate. Rapid agitation is used throughout the whole procedure. The temperature of the reaction mixture rises to 95° C., then begins to subside. The material is brought to reflux by application of heat and held at reflux for 30 minutes, then cooled to −3° C., diluted with 1800 parts of water, and treated with 535 parts of methyl chloroformate in one portion. A 25% solution of aqueous sodium hydroxide is added at such a rate as to keep the pH of the reaction mixture between 6 and 7 and the temperature below 25° C. When the pH of the mixture reaches 6.9 and the rate of change of pH has become negligible, the addition of base is stopped. The amount of base required is 1085 parts by volume of 25% solution. The temperature at the end of this addition is 23° C. Immediately after completion of the base addition, 360 parts of glacial acetic acid is added over a 20 minute period, followed by 324 parts of o-phenylenediamine in one portion. The resulting mixture is slowly warmed to 80° C. and held there for 30 minutes, then cooled to 27° C. and the light tan solid product isolated by filtration, washed well with water and acetone, and air-dried.

2-benzimidazolecarbamic acid, ethyl ester is similarly made using ethyl chloroformate in place of the methyl chloroformate of the above example.

Example 2

| | Percent |
|---|---|
| 2-benzimidazolecarbamic acid, methyl ester | 30.0 |
| Calcium, magnesium ligninsulfonate | 15.0 |
| Hydrated attapulgite | 1.4 |
| Anhydrous sodium carbonate | 2.1 |
| Water | 51.5 |

The above components are sandground together until substantially all particles are below 3 microns, as seen in a microscope, and more than half of the active ingredient is in the form of particles having a diameter less than 2 microns.

A field planting of rice in Louisiana is heavily inoculated with the rice blast fungus. Three days later, after the fungus has had adequate time to penetrate and become established in the rice plants, selected plots are sprayed with water and the composition described above in an amount to provide 300 p.p.m. of the active compound of this invention. The spray is applied at the rate of 800 liters per hectare. Four weeks later, the rice plants in the treated plots remain healthy. The untreated rice surrounding the plots, on the other hand, is heavily diseased with blast.

As the rice is inoculated well in advance of treatment, the curative effect of the composition and method is demonstrated.

Still other plots in the same planting are sprayed with water containing the composition described above at a concentration containing 12,000 p.p.m. of the active compound of this invention. The rice treated at this very high level exhibits no evidence of chemical injury, thus, illustrating the high degree of crop safety shown by the compounds of this invention.

Example 3

| | Percent |
|---|---|
| 2-benzimidazolecarbamic acid, methyl ester | 26 |
| ("Piccolyte" S–10), a thermoplastic polyterpene resin | 38.57 |
| Low-boiling isoparaffin oil | 26.43 |
| Lauryloxypolyethoxyethanol | 9 |

The resin in the above mixture is first dissolved in the isoparaffin oil, then the other components are added and the whole sand-milled until substantially all particles are below 5 microns and approximately 50% by weight of the active consists of particles having a diameter of 2 microns or less.

Four liters of the above composition are added to 38 liters of water. This immediately forms an excellent emulsion. The resulting emulsion is sprayed from the air on one hectare of banana plants. Treatment is repeated at intervals of 21 days. Six months after the first application, the sprayed banana plants remain healthy whereas the unsprayed banana plants surrounding are heavily damaged by Sigatoka disease.

Example 4

| | Percent |
|---|---|
| 2-benzimidazolecarbamic acid, methyl ester | 50 |
| Kaolinite clay | 50 |

The ingredients are mixed and air-milled. This dust concentrate contains at least 40% by weight of the active ingredient as particles which are 2 microns or smaller. The concentrate is then blended with talc to prepare a 2% dust.

The diluted preparation is dusted at the rate of 30 kg. per hectare on random plots on a celery field in Florida.

Four weeks after treatment, the dusted plots contain only healthy celery plants which are growing well. The untreated areas surrounding the plots, however, are heavily diseased with celery early blight and, clearly, are of less thrifty growth.

Similar results are obtained when 2-benzimidazolecarbamic acid, ethyl ester is formulated and applied in the same manner.

Example 5

| | Percent |
|---|---|
| 2-benzimidazolecarbamic acid, methyl ester | 70 |
| Polyethylene oxide adduct of dodecylphenol | 2.5 |
| Methylcellulose (low viscosity) | 0.3 |
| Synthetic fine silica | 27.2 |

The above components are blended together, micropulverized, then air-milled until about half of the active ingredient is in the form of 2 microns or smaller particles, as determined by Andreasen pipette sedimentation.

Selected plots in a sugar beet field in Minnesota are sprayed at 14-day intervals with water to which has been added a sufficient amount of the above composition to provide 250 p.p.m. of the active compound of this invention in the final suspension. The application rate of the suspension is 800 liters per hectare on each day of treatment.

During the 12 weeks after the start of the test, weather is good for sugar beet growth and there are frequent intervals during which infection with the sugar beet leaf spot fungus can take place. At the end of the test, the beets in the treated plots are healthy and growing well. The untreated areas surrounding the treated plots, on the other hand, contain only beets heavily diseased with sugar beet leaf spot.

Similar applications at active ingredient rates up to 64 times those employed above cause no injury to sugar beets.

2-benzimidazolecarbamic acid, ethyl ester when applied similarly gives similar results.

Example 6

A sample of technical 2-benzimidazolecarbamic acid, methyl ester is hammer-milled in a micropulverizer through a screen having openings of 0.020 inch in diameter. A portion of this material is then air-milled twice.

Particle size analysis of the air-milled material by Andreasen pipette sedimentation shows that 65% by weight of the active is in the form of particles having a diameter smaller than 2 microns. By nitrogen adsorption the specific surface area of this material is determined to be 8.6 square meters/gram. By contrast, that portion of the sample which was merely hammer-milled has only a specific surface area of 3.0 square meters per gram, and only 10% of the material is in the form of particles having a diameter of less than 2 microns.

The ground technical materials are intimately blended with surfactants and inert ingredients as follows:

| | Percent |
|---|---|
| 2-benzimidazolecarbamic acid, methyl ester | 70.0 |
| Sodium salt of alkylbenzenesulfonic acid | 4.5 |
| Sodium salt of partially desulfonated lignin sulfonates | 3.0 |
| Magnesium carbonate | 22.5 |

When the material prepared from the air-milled technical is sprayed on young cucumber plants in the greenhouse at very low rates (16 p.p.m. in the spray) in a test with powdery mildew, excellent control of the disease is obtained. The disease control is significantly superior to that obtained from the material containing technical which has only been hammer-milled. Similar applications at active ingredient rates up to 100 times those employed above cause no injury to cucumber plants.

The compositions prepared from the air-milled material and the merely hammer-milled material are subjected to accelerated storage conditions by holding the compositions at 50° C. for six months. At the end of this period, chemical analysis shows essentially no loss of active ingredient content for either the extremely fine or the coarse composition, indicating that in spite of its fine particle size the air-milled product is as stable as the much coarser hammer-milled product.

Example 7

A sample of technical 2-benzimidazolecarbamic acid, methyl ester is hammer-milled in a micropulverizer through a screen having openings of 0.027 inch in diameter. A portion of this material is then carefully air-milled at a steady feed rate. The hammer milled and the air milled portions are each blended with formulation ingredients as follows:

| | Percent |
|---|---|
| 2-benzimidazolecarbamic acid, methyl ester | 52.6 |
| Sucrose | 43.65 |
| 2-benzimidazolecarbamic acid, methyl ester | 52.6 |
| "Aerosol" OT-B (sodiumdioctylsulfosuccinate) | 3.0 |
| "Methocel" 15 (methylcellulose) | 0.75 |

The particle size distribution of each of the two products is determined as follows:

Six grams of product is gently pasted into a small quantity of distilled water and then diluted with 35 to 40 ml. of distilled water; the resulting slurry is stirred for 15 minutes. This concentrate is then diluted to 1% total slurry concentration with distilled water and the resulting slurry is mixed by inverting the containers 10 to 20 times. The diluted slurry is poured into each of two Andreasen pipettes. Pipette A is shaken vigorously for one minute, and duplicate 10 ml. control samples are withdrawn and collected in tared aluminum weighing dishes. After adjusting the slurry height to exactly 5 cm. above the sampling point, it is shaken again for one minute and sedimentation is then allowed to proceed. Pipette B is handled in the same way except that the height of the slurry is adjusted to 10 cm.

Duplicate 10 ml. samples are withdrawn from the pipettes at times calculated from the slurry settling heights and the desired particle size discrimination by the following equation:

$$d=175\sqrt{\frac{n}{\rho_1-\rho_2}\cdot\frac{h}{t}}$$

$d$=diameter of equivalent spheres, microns
$n$=viscosity of settling medium, poise
$\rho_1$=density of particles, g./cm.$^3$ (1.50 for technical 2-benzimidazolecarbamic acid, methyl ester)
$\rho_2$=density of settling fluid, g./cm.$^3$
$h$=settling height, cm.
$t$=setting time, min.

The samples are allowed to evaporate to dryness at room temperature and are then dried to constant weight at 70° C.

Dried sample weights are corrected for the constant weight of water-soluble components, averaged, and this average is divided by the corrected average for the control samples. The weight fraction of the total insoluble material which still remains in suspension above the sampling point is thus calcuated for the various particle sizes.

The results of this particle size analysis are shown in the following table:

| Sample | Weight fraction under— | | | | |
|---|---|---|---|---|---|
| | $1\mu$ | $1.8\mu$ | $2.5\mu$ | $5\mu$ | $10\mu$ |
| Hammer-milled | 0.08 | 0.13 | 0.23 | 0.56 | 0.84 |
| Air-milled | 0.32 | 0.70 | 0.94 | 0.99 | 0.98 |

From a plot of these data, sedimentation analysis shows that approximately 78% by weight of the active ingredient in the air-milled sample is present in the form of particles having a diameter less than 2 microns, while the hammer-milled sample contains only approximately 15% of less than 2 micron material.

As part of the sedimentation analysis, samples of some of the fractions are examined microscopically to ensure (a) that the calculated particle diameters are approximately correct, (b) that the sample is clean, i.e., free from larger particles, and (c) that gross amounts of agglomerates are absent. Slurry agglomeration is tested in another way in such an experiment: samples corresponding to a cut size of $1.8\mu$ are taken from both pipettes A and B; since the settling heights are quite different, settling times also differ for the two samples. The extent of agglomeration usually increases as the age of a slurry increases. Hence, if agglomeration were occurring to any extent in these slurries, the later $1.8\mu$ samples would be expected to contain less solid. In the several such experiments, values for the two $1.8\mu$ samples are in excellent agreement (average deviation 6%), indicating no interference from flocculation or agglomeration.

The particle size of 2-benzimidazolecarbamic acid, methyl ester after hammer-milling and air-milling as described above is also evaluated by microscopic counting.

Slides are prepared by mixing the unformulated material with Celvacene® light vacuum grease and covering the mixture with 25 mm. cover glasses. The slides are examined at several magnifications with a Nikon SUR–KE microscope with Polaroid camera attachment. Several photomicrographs are made of representative areas of each slide at these different magnifications.

These photomicrographs are used to count the individual particles. A clear, thin plastic template is prepared with round holes corresponding to 1, 2, 3, etc. microns at 800× magnification. Particle images which match in area a given hole size are counted and marked by piercing the photomicrograph with a small needle; particles are thus counted only once. This procedure is continued until all particles with a sufficiently clear image are counted.

In order to estimate the third dimension of these particles, samples are prepared for electron microscopy by making chromium shadowcasts at an angle of 22°. The particles and their shadows are examined in an electron microscope and electron micrographs are made. These pictures indicate that nearly all of the particles are plates. It is assumed that all platelets have the same thickness, and the size distribution is calculated for each sample by multiplying the number of particles of a given size by the square of the particle diameter, as it is seen in the microscope. Since this product is proportional to the weight of platelet particles having a uniform thickness, the fraction of each size is readily calculated by dividing each product by the sum of all such products for the sample.

The results of this microscopic count are shown in the following table:

| Sample | $1\mu$ | $2\mu$ | $3\mu$ | $5\mu$ | $10\mu$ |
|---|---|---|---|---|---|
| Hammer-milled | 0.03 | 0.13 | 0.23 | 0.43 | 0.84 |
| Air-milled | 0.20 | 0.72 | 0.92 | 0.99 | 1.0 |

For the air-milled product, 72% by weight of the active ingredient consists of particles having a diameter less than 2 microns, while only 13% of the hammer-milled product has a similar small particle size.

The air-milled product is compared with the hammer-milled product in a field experiment in Forida. A planting of cucumbers is divided into individual plots composed of single rows 10 meters long. Alternate rows are left unsprayed all season to serve as buffers and as a source of fungus inoculum. The plants are beginning to bloom and are infected with powdery mildew before the first treatment is applied, thus an established infection must be eradicated and uninfected foliage protected if the chemical is to be effective. The above compositions are added to water at a rate of 80 p.p.m. of the active compound of this invention in the final aqueous preparation. Each of these preparations is then sprayed on six of the plots randomized through the field. Applications of each of the preparations are made at 7-day intervals at a rate equal to 800 liters per hectare.

During the 10 weeks after the start of the test, the powdery mildew fungus continues to infect, grow and spread through the cucumber planting. At the end of the test, those plots receiving the treatments of the air-milled product are healthy and support a normal yield of cucumbers. The leaves are large and green and completely cover the plot area. The plots treated with the hammer-milled product, on the other hand, are heavily infected with powdery mildew. The leaves are dusty white and the number and size of cucumbers is reduced. Untreated plots and buffer rows are so badly damaged by the disease that most of the leaves have dried up, exposing the meager cucumber crop to damage by sun scald. The yield is a total loss where untreated.

Example 8

| | Percent |
|---|---|
| 2 - benzimidazolecarbamic acid, methyl ester | 10.0 |
| Paraffinic spray oil | 85.0 |
| Lecithin | 5.0 |

The above ingredients are combined and sand-ground to produce a composition with a particle size below two microns. The above composition can be sprayed directly from an ultra-low-volume type applicator or diluted with additional paraffinic spray oil and applied in a more conventional low-volume type of application.

The above composition is sprayed undiluted on a portion of a rice paddy at the rate of 3 liters per hectare. The spray is applied at blossom time and again 10 days later. At harvest the rice heads are full and healthy in the treated area. On the other hand, much of the untreated rice is lost because of the rice blast disease.

Example 9

The following composition is prepared.

| | Percent |
|---|---|
| 2-benzimidazolecarbamic acid, methyl ester | 51.6 |
| Sucrose | 44.9 |
| Sodium dioctylsulfosuccinate | 3.0 |
| Methyl cellulose | 0.5 |

The above ingredients are hammer-milled in a micropulverizer to a particle size essentially below 100 microns. The micropulverized product is then air-milled at a steady feed rate, until about half of the active ingredient is in the form of particles having diameters less than 2 microns.

The composition is slurried in water at 300 p.p.m. active along with any of the following emulsifiable oils at 2000 p.p.m.

"Orchex" 796 caster oil containing containing 10% octylphenoxypolyethoxyethanol-7 E.O. [1]

corn oil containing 2.5% each of polyoxyethylene sorbitol hexaoleate and polyoxyethylene sorbitol oleate.

[1] E.O.=Ethylene oxide.

Sunoco Superior Spray oil No. 7E
Sunoco oil No. 7N containing 1–10% of the following emulsifiers either alone or in combination:

lauryloxypolyethoxyethanol-7 E.O.
polyoxyethylene sorbitol hexaoleate
polyoxyethylene sorbitol oleate
oleyloxypolyethoxyethanol-2 E.O.
stearyloxypolyethoxyethanol-10 E.O.
polyoxyethylene(20)sorbitan monooleate
polyoxyethylene (30) stearate
polyethylene glycol 200 monolaurate
polyhydric alcohol ester ("Trem" 014)
oil-soluble petroleum sulfonates Selected apple trees in an orchard are sprayed to the point of run-off with the above composition at a concentration of 300 p.p.m. of the active ingredient in water along with 2,000 p.p.m. of one of the listed oils. The first treatment is made when the trees are in the tight cluster stage of development. This is after two extended rainfall periods which resulted in primary apple scab infection. Additional treatments are made throughout the growing season on an interval of every 18 days.

At the time of harvest, the treated trees are green and healthy with a full crop of disease-free fruit. The untreated trees, on the other hand, are partly defoliated and the fruit is unmarketable because of apple scab.

Some of the oils included in the above compositions may cause injury to certain plants under some environmental conditions.

Example 10

| | Percent |
|---|---|
| Dust concentrate of Example 4 | 4.0 |
| Polyethylene glycol 6000 | 15.0 |
| Synthetic fine silica | 15.0 |
| Talc | 66.0 |

The above ingredients are micropulverized through a coarse screen to obtain a 2% active dust suitable for application by air.

A peanut field is selected in which there is a low but uniform incidence of leaf spot disease already present. A portion of the field is treated by dusting at a rate of 20 kg. per hectare each 10 days for the remainder of the growing season.

At harvest time, careful observation reveals that the plants in the dusted area have good healthy foliage and the disease which was evident before treatment was eradicated. Yields of peanuts in the treated area are above normal. The plants in the adjacent untreated area of the field are almost completely defoliated by leaf spot disease and yields are less than half those in the treated area.

Example 11

| | Percent |
|---|---|
| Dust concentrate of Example 4 | 2.0 |
| Sodium toluenesulfonate | 4.0 |
| Sodium sulfate | 4.0 |
| Talc | 90.0 |

The above ingredients are micropulverized through a coarse screen to obtain a 1% active dust suitable for application to plants by conventional means.

Roses treated by dusting lightly each week resist infection by the fungi causing powdery mildew and black spot diseases. Roses growing nearby, but left untreated, are so badly injured by disease that they do not produce satisfactory blossoms.

Example 12

The composition of Example 9 is slurried in water at 16 p.p.m. active along with any one of the following humectants at 1000 p.p.m.

sodium toluenesulfonate
sodium dodecylbenzenesulfonate
polyethylene glycol 400
polyethylene glycol 600
polyethylene glycol 1000
polyethylene glycol 5000
nonylphenoxypolyethoxyethanol-100 E.O.

The fungicidal activity of the above combinations is greater than that which is obtained from the fungicidal component alone.

Example 13

| | Percent |
|---|---|
| 2-benzimidazolecarbamic acid, methyl ester (double air-milled technical of Example 6) | 15.0 |
| Maneb | 60.0 |
| Methylcellulose | 1.0 |
| Sodium alkylnaphthalenesulfonate | 1.0 |
| Calcium ligninsulfonate | 2.5 |
| Sucrose | 20.5 |

The above ingredients are blended and micropulverized to a particle size essentially less than 50 microns for all components. The above composition is diluted in water to provide a concentration of 300 p.p.m. of the active benzimidazole. This suspension is sprayed to run-off on selected grapevines placed randomly throughout a vineyard. At the time of the first spray (blosson time), there are a few colonies of powdery mildew evident on some of the older leaves. Treatments are repeated on a 14-day schedule until harvest, and there are several humid periods of rainfall when downy mildew is infecting vines.

At harvest it is observed that the treated vines are healthy and supporting a full crop of grapes which are firm and healthy. The untreated vines in the same vineyard are badly defoliated by downy mildew, distorted by powdery mildew, and supporting grapes cracked open and rotted by powdery mildew and Botrytis gray mold. The combination of fungicides has been more effective for the control of these several diseases than either fungicide alone.

Example 14

| | Percent |
|---|---|
| 2-benzimidazolecarbamic acid, methyl ester | 25.0 |
| Nonylphenoxypolyethoxylethanol-100E.O. | 25.0 |
| Water | 49.0 |
| Hydrated attapulgite | 1.0 |

The above ingredients are blended and sand-ground to an active particle size essentially below 5 microns. The resulting suspension can be readily dispersed into water.

The above composition is added to water in an amount to provide 250 p.p.m. of the active compounds of this invention. This preparation is sprayed on alternate trees in a Michigan cherry orchard at the rate of 10 liters per tree. A normal treating schedule for cherries is used starting early in the season. At the end of the summer and more than six weeks after the last application, the treated trees are healthy and retain all foliage. The adjoining untreated trees, on the other hand, are heavily defoliated by the cherry leaf spot disease.

Example 15

| | Percent |
|---|---|
| 2-benzimidazolecarbamic acid, methyl ester | 20.0 |
| Paraffinic spray oil | 75.0 |
| Polyoxyethylene sorbitol hexaoleate | 2.5 |
| Polyoxyethylene sorbitol oleate | 2.5 |

The above ingredients are blended and the active component sand-ground to a particle size essentially below 5 microns. The resulting suspension can be emulsified into water.

Four liters of the above composition are added to 38 liters of water. This immediately forms an excellent emulsion. The resulting emulsion is sprayed from the air on one hectare of banana plants. Treatment is repeated at intervals of 21 days. Six months after the first application, the sprayed banana plants remain healthy. The unsprayed banana plants surrounding, on the other hand, are heavily damaged by Sigatoka disease.

Example 16

| | Percent |
|---|---|
| 2-benzimidazolecarbamic acid, methyl ester | 25.0 |
| Corn oil | 70.0 |
| Polyoxyethylene sorbitol hexaoleate | 2.5 |
| Polyoxyethylene sorbitol oleate | 2.5 |

The active component is air milled to a particle size below 5 microns and is suspended in the oil and blended with the remaining ingredients. The resulting suspension of fine particles can be emulsified into water.

Selected apple trees in an orchard are sprayed to the point of run-off with the above composition at a concentration of 300 p.p.m. of the active ingredient in water along with 2,000 p.p.m. of one of the listed oils. The first treatment is made when the trees are in the tight cluster stage of development. This is after two extended rainfall periods which resulted in primary apple scab infection. Additional treatments are made throughout the growing season on an interval of every 18 days.

At the time of harvest, the treated trees are green and healthy with a full crop of disease-free fruit. The untreated trees, on the other hand, are partly defoliated and the fruit is unmarketable because of apple scab.

Example 17

| | |
|---|---|
| 2-benzimidazolecarbamic acid, methyl ester | 52.0 |
| Sulfur (flowers) | 44.25 |
| Methocel | 0.75 |
| Sodium dioctylsulfosuccinate | 3.0 |

The above components are blended and hammer-milled to a particle size below 100 microns. The micropulverized product is then air-milled at a steady feed rate until the particles of both the benzamidazole and the sulfur are essentially below 5 microns in size.

Grape vines are selected at random in a vineyard which is uniformly infected with a low level of powdery mildew. The above composition is diluted in water to provide concentrations of 100, 50, and 25 p.p.m. of the active benzimidazole. These three treatments are compared with similar concentrations of the composition of Example 7, which lacks sulfur, and also similar concentrations of wettable sulfur alone. The nine treatments are applied to the point of run-off to designated vines throughout the growing season on an interval of every 14 days. At the time of harvest the vines and fruit receiving the three concentrations of the above composition are obviously more healthy and disease free than comparable rates of the other treatments. Those vines treated with only sulfur and the untreated vines are badly damaged by powdery mildew, and the fruit on these vines is a total loss due to fungus rots and powdery mildew.

I claim:

1. A method for the curative and preventive control of fungus diseases of living plants or plant parts with a wide margin of safety to the plants, comprising applying to the plants or plant parts a nonphytotoxic, fungicidally effective amount of particles having a diameter below 5 microns of a 2-benzimidazolecarbamic acid, alkyl ester of the formula:

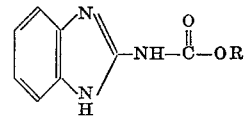

where R is methyl or ethyl.

2. The method of claim 1 wherein at least 40% by weight of the particles of the compound of the formula are below 2 microns in diameter.

3. The method of claim 2 wherein the compound of the formula applied is 2-benzimidazolecarbamic acid, methyl ester.

References Cited

UNITED STATES PATENTS

| | | | |
|---|---|---|---|
| 2,933,502 | 4/1960 | Klopping | 424—273 |
| 3,010,968 | 11/1961 | Loux | 424—273 |
| 3,454,700 | 7/1969 | Hyson | 424—273 |

OTHER REFERENCES

Gregory, T. C.: "Uses & Applications of Chemicals & Related Materials" (1939), 2nd ed., p. 576, Reinhold Pub. Corp.

ALBERT T. MEYERS, Primary Examiner

V. D. TURNER, Assistant Examiner